Patented Oct. 30, 1923.

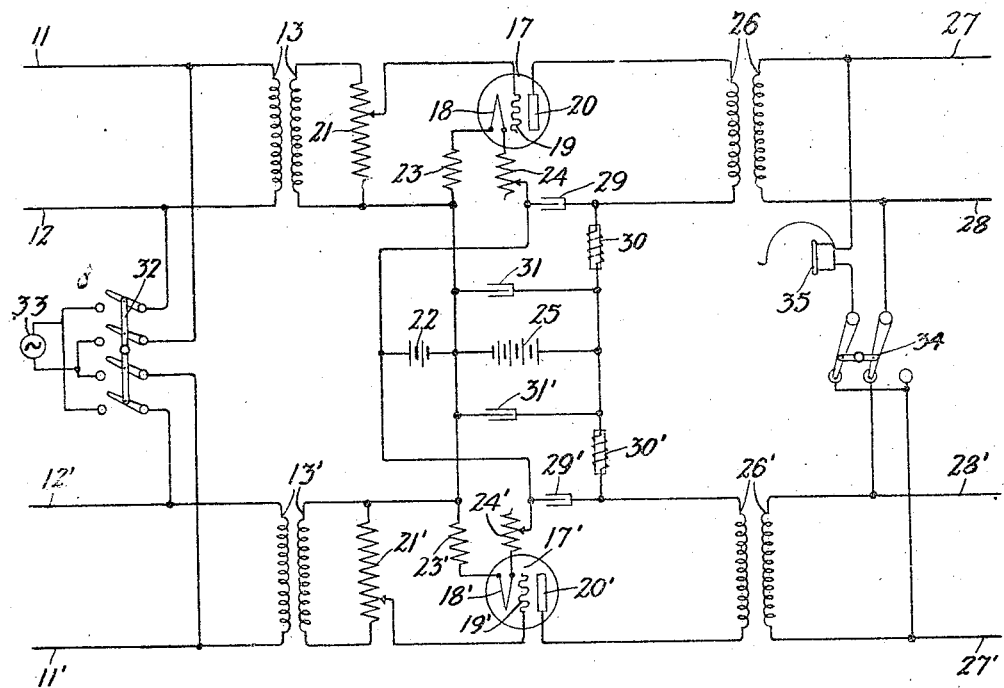

1,472,455

UNITED STATES PATENT OFFICE.

DAVID G. BLATTNER, OF NEW YORK, N. Y., ASSIGNOR TO WESTERN ELECTRIC COMPANY, INCORPORATED, OF NEW YORK, N. Y., A CORPORATION OF NEW YORK.

TESTING CIRCUITS.

Application filed June 24, 1919. Serial No. 306,325.

*To all whom it may concern:*

Be it known that I, DAVID G. BLATTNER, a citizen of the United States, residing at New York, in the county of New York and State of New York, have invented certain new and useful Improvements in Testing Circuits, of which the following is a full, clear, concise, and exact description.

This invention relates to testing circuits and more particularly to a method and means for equalizing the transmission characteristics of two electric transmission lines or of corresponding portions thereof.

In certain cases, as for example in the binaural system referred to below, where separate transmission lines are employed for carrying energy to a point where the energy carried by one line is to be compared with the energy carried by another line, it is important that the transmission characteristics of corresponding portions of the two lines be substantially identical. The reason for this is that the observer should be able to make the comparison above referred to without danger of errors, due to the effects of unequal changes in the energy in the course of transmission through the lines.

The object of this invention is to provide means for testing and adjusting corresponding portions of similar transmission lines so that equal amounts of energy supplied to the input ends of such portions in the same phase relation will produce equal effects in their outgoing ends.

One form of the invention is described and illustrated herein as being applied to two thermionic amplifiers adapted to be placed in the two lines of a binaural system, and the arrangement is such that when one of the amplifiers has been adjusted to give a desired amplification, the output circuits of the two amplifiers can be connected in series opposition, their input circuits connected in parallel to a source of electric impulses, and the other amplifier then adjusted until the impulses produced in the respective output circuits are substantially equal. This result is obtained when substantially no current can be detected in the series opposition circuit.

In the binaural system, which is employed for determining the position of an object from which sound waves are emanating, there are sometimes employed two transmission lines leading to receiving apparatus in the form of telephone receivers adapted to be listened to simultaneously by an observer, the sending ends of the transmission lines being adapted to be selectively connected to pairs of telephone transmitters, the position and angular relation of which are known to the observer. By observing the difference in the time at which a given sound is heard in the two receivers, the direction of the source of sound can be approximately determined, and by obtaining the direction of the source of sound with respect to a different pair of transmitters, its position, both with respect to direction and distance, can be approximately determined. The complete apparatus employed in the system is not shown herein, since it is not believed to be necessary to an understanding of this invention.

In some instances it has been found desirable to place amplifiers in the transmission lines so as to render the sound waves of sufficient strength to be audible to the observer. These amplifiers, as well as all other parts of the transmission lines, are carefully selected so as to be as nearly alike as possible. In addition, a special circuit arrangement is employed for adjusting and testing the amplifiers for insuring equal amplification, as above stated.

The invention will be more fully understood from the following detailed description and claims taken in connection with the accompanying drawing, in which the view represents diagrammatically a circuit embodying this invention.

Referring to the drawing by reference numerals, the incoming line conductors 11 and 12 of one of the lines are connected to the primary of a transformer 13. The secondary of transformer 13 is included in the input circuit of the vacuum tube 17 having the filamentary cathode 18, the grid or control electrode 19, and the anode 20. A potentiometer 21 is connected across the secondary of transformer 13. Current for heating the cathode 18 is supplied by a suitable source illustrated in the drawing as a battery 22. A resistance 23 is placed in the portion of the heating current circuit which is included in the input circuit of the tube 17 and serves to maintain the grid 19 negative with respect to the cathode 18. An adjustable resistance 24 serves to control the temperature of the cathode 18.

A source of current shown as a battery 25 supplies space current between the cathode 18 and anode 20. This current flows through the primary of the output transformer 26, the secondary of which is connected to the outgoing line conductors 27 and 28. The condenser 29 provides a path for alternating currents in the output circuit.

It will be understood that the amplifier above described is adapted to be inserted in one of the lines of a binaural system. Another amplifier, as nearly like the first as can be obtained by selecting the apparatus making up the amplifier, is inserted in the other line of the system and is shown in the drawing for convenience with the circuits reversed with respect to the top and bottom of the sheet. Corresponding parts are designated by the same reference numerals but with prime marks added, and further description of these parts is unnecessary. For the purpose of rendering the operation of the two amplifiers as near alike as possible and independent of fluctuations in the batteries, the same batteries 22 and 25 are used to supply both tubes 17 and 17' with heating current and space current respectively.

For the purpose of preventing impulses from one line from passing to the other line through the common battery connections and also to keep out noises from the battery, a filter is provided in each branch comprising choke coils 30 and 30', condensers 29 and 29' and condensers 31 and 31'.

For testing and adjusting the amplifiers, the primaries of the input transformers 13 and 13' may be connected by means of a switch 32 to a buzzer or other device 33 capable of producing electric impulses of audible frequency. The secondaries of the output transformers 26 and 26' may be connected together by switch 34 in a series circuit including the telephone receiver 35. Switch 34 is a reversing switch so that the coils may be either in series opposition or series aiding relation.

One of the amplifiers, for example that shown at the top of the drawing, is first adjusted by means of potentiometer 21 and heating current control 24 until a satisfactory amplification is obtained. If the amplifiers have been connected into the transmission lines they are then disconnected by suitable means (not shown), switch 32 is closed and switch 34 is closed in the position shown in the drawing, so that the output currents will oppose each other.

The second amplifier is then adjusted preferably by first adjusting potentiometer 21' until as little noise as possible is heard in receiver 35, and then adjusting the cathode temperature by means of adjustable resistance 24' until substantially no sound is heard in the receiver. To be sure that the amplifiers are operating, switch 34 may be thrown to the position in which the output currents aid each other, and a loud sound should be heard in the receiver. Switches 32 and 34 are then opened and the amplifiers are ready to be connected into the lines for use.

While one form of the invention has been illustrated, it is to be understood that the invention is not limited to the specific form shown, but the equivalents thereof may be used within the scope of the following claims.

What I claim is:

1. The method of equalizing the operation of two devices for amplifying electric impulses, which comprises impressing equal electric impulses of an audible frequency on the input circuits of said devices, reproducing said impulses with amplified energy in the output circuits of said devices, opposing an effect produced by the output current of one of said devices to a similar effect from the other of said devices, and adjusting the potential applied to one of said devices until said effects substantially counterbalance each other.

2. The method of equalizing the operation of two thermionic amplifying devices, which comprises impressing equal electric impulses on the input circuits of said devices, opposing an effect produced by the output current of one of said devices to a similar effect from the other of said devices, varying the ratio of amplification of one of said devices until said effects substantially counterbalance each other, and then varying the rate of production of electrons in one of said devices to obtain a more exact balance between said effects.

3. In combination, two similar transmission lines having corresponding energy amplifying means therein, means for connecting the input circuits of said amplifiers in parallel to a source of audible frequency electric impulses, means for connecting the output circuits of said amplifiers in series opposition, current-indicating means in said series opposition path, and a variable attenuating device in one of said lines.

4. In combination, two vacuum tube repeaters having their input circuits connected in parallel to a source of electric impulses, and having their output circuits connected in series opposition, current-indicating means in said series opposition path, and a potentiometer in the input circuit of one of said repeaters.

5. In combination, two repeaters each comprising a vacuum tube having a cathode, an anode and a control electrode, means for heating said cathodes, said repeaters having their input circuits connected in parallel to a source of electric impulses, and their output circuits connected in series opposition, current-indicating means in said series opposition path, a potentiometer in the input circuit of one of said repeaters, and means for varying the temperature of one of said cathodes.

6. In combination, two repeaters each comprising a vacuum tube having a cathode, an anode, and a control electrode, an input transformer for each of said tubes having its secondary connected to the cathode and control electrode thereof, an output transformer for each of said tubes having its primary connected to the cathode and anode thereof, means for connecting the primaries of said input transformers in parallel to a source of electric impulses, means for connecting the secondaries of said output transformers in series opposition, current-indicating means in said series opposition path, and means for adjusting the amplification of one of said repeaters.

7. In combination, two repeaters each comprising a vacuum tube having a cathode, an anode, and a control electrode, an input transformer for each of said tubes having its secondary connected to the cathode and control electrode thereof, a potentiometer between each of said secondaries and said electrodes, a source of electric impulses, means for connecting the primaries of said input transformers in parallel to said source, common means for supplying heating current to said cathodes, common means for supplying space current to said tubes, means for preventing cross-talk through said common connections, an output transformer for each tube having its primary connected to the cathode and anode thereof, connections from the secondaries of said output transformers to a reversing switch whereby they may be connected either in series aiding or series opposing relation, and a telephone receiver in said series path.

In witness whereof, I hereunto subscribe my name this 17th day of June A. D., 1919.

DAVID G. BLATTNER.